United States Patent
Keller

(10) Patent No.: US 9,192,887 B2
(45) Date of Patent: Nov. 24, 2015

(54) PROCESS FOR IN-SITU PRODUCTION OF LOW DISSOLVED HYDROGEN SULFIDE, DEGASSED, SULFUR FROM CLAUS SULFUR RECOVERY

(71) Applicant: PHILLIPS 66 COMPANY, Houston, TX (US)

(72) Inventor: Alfred E. Keller, Katy, TX (US)

(73) Assignee: Phillips 66 Company, Houston, TX (US)

(*) Notice: Subject to any disclaimer, the term of this patent is extended or adjusted under 35 U.S.C. 154(b) by 0 days.

(21) Appl. No.: 14/303,946

(22) Filed: Jun. 13, 2014

(65) Prior Publication Data

US 2014/0377155 A1  Dec. 25, 2014

Related U.S. Application Data

(60) Provisional application No. 61/837,927, filed on Jun. 21, 2013, provisional application No. 61/837,944, filed on Jun. 21, 2013, provisional application No. 61/837,950, filed on Jun. 21, 2013, provisional application No. 61/837,958, filed on Jun. 21, 2013, provisional application No. 62/010,766, filed on Jun. 11, 2014.

(51) Int. Cl.
*B01D 5/00* (2006.01)
*C01B 17/04* (2006.01)
(Continued)

(52) U.S. Cl.
CPC .............. *B01D 53/002* (2013.01); *B01D 5/00* (2013.01); *B01D 5/0012* (2013.01);
(Continued)

(58) Field of Classification Search
CPC ...... B01D 53/002; B01D 5/00; B01D 5/0069; F25J 1/0002; F25J 1/00; C01B 17/05; C01B 17/0447; C01B 17/04; C01B 17/0404
See application file for complete search history.

(56) References Cited

U.S. PATENT DOCUMENTS

| 2,049,160 A | 7/1936 | Gleason et al. |
| 2,994,588 A * | 8/1961 | Eickmeyer ................. 423/574.2 |

(Continued)

FOREIGN PATENT DOCUMENTS

CN  201832437 U  *  5/2011  ............... B01D 5/00

OTHER PUBLICATIONS

Haldor Topsoe Catalysing Your Business, "Claus Unit Tail Gas Treatment Catalysts", 8 pages, No date.
(Continued)

*Primary Examiner* — Timothy Vanoy
(74) *Attorney, Agent, or Firm* — Phillips 66 Company

(57) ABSTRACT

A process of producing degassed liquid sulfur within a vertical sulfur condenser may include providing a plurality of condenser tubes within an external casing; submerging exit ends of the plurality of condenser tubes within a liquid reservoir resulting in submerged exit ends of the plurality of condenser tubes; passing the Claus process gas into an inlet end of the plurality of condenser tubes; condensing the Claus process gas within the condenser tubes to produce condensed Claus process gas within the plurality of condenser tubes; and collecting the condensed Claus process gas in the liquid reservoir upon exiting of the condensed Claus process gas at an exit end of the plurality of condenser tubes. The process may further include converting hydrogen sulfide by the Claus reaction $2H_2S+SO_2 \Leftrightarrow 3/xSx+2H_2O$, and decomposing polysulfanes to hydrogen sulfide and sulfur, wherein elemental sulfur is freed from hydrogen sulfide.

17 Claims, 9 Drawing Sheets

(51) Int. Cl.
*C01B 17/05* (2006.01)
*F25J 1/00* (2006.01)
*B01D 53/00* (2006.01)
*C01B 17/02* (2006.01)

(52) U.S. Cl.
CPC .......... *B01D 5/0051* (2013.01); *B01D 5/0069* (2013.01); *B01D 5/0093* (2013.01); *C01B 17/0232* (2013.01); *C01B 17/0447* (2013.01); *C01B 17/05* (2013.01); *F25J 1/00* (2013.01); *F25J 1/0002* (2013.01)

(56) References Cited

U.S. PATENT DOCUMENTS

| | | | | |
|---|---|---|---|---|
| 3,463,611 | A | * | 8/1969 | Haritatos et al. ........... 423/574.1 |
| 3,532,468 | A | * | 10/1970 | Beavon ...................... 423/574.1 |
| 3,607,132 | A | | 9/1971 | Sudduth |
| 3,675,710 | A | * | 7/1972 | Ristow .......................... 165/111 |
| 3,939,250 | A | | 2/1976 | Michel et al. |
| 4,508,699 | A | | 4/1985 | Schoofs |
| 4,729,887 | A | | 3/1988 | Pendergraft |
| 4,897,251 | A | | 1/1990 | Maurice et al. |
| 4,935,221 | A | | 6/1990 | Bronfenbrenner et al. |
| 5,015,459 | A | | 5/1991 | Pendergraft |
| 5,015,460 | A | | 5/1991 | Pendergraft |
| 2005/0201924 | A1 | | 9/2005 | Ramani et al. |
| 2008/0050306 | A1 | | 2/2008 | Keller et al. |

OTHER PUBLICATIONS

PCT Notification of Transmittal of the International Search Report and the Written Opinion of the International Searching Authority, or the Declaration, International Filing Date: Jun. 17, 2014; International Application No. PCT/US2014/042709; 16 pages.

PCT Notification of Transmittal of the International Search Report and the Written Opinion of the International Searching Authority, or the Declaration, International Filing Date: Jun. 17, 2014; International Application No. PCT/US2014/042717; 10 pages.

PCT Notification of Transmittal of the International Search Report and the Written Opinion of the International Searching Authority, or the Declaration, International Filing Date: Jun. 17, 2014; International Application No. PCT/US2014/042725; 13 pages.

PCT Notification of Transmittal of the International Search Report and the Written Opinion of the International Searching Authority, or the Declaration, International Filing Date: Jun. 17, 2014; International Application No. PCT/US2014/042776; 8 pages.

PCT Notification of Transmittal of the International Search Report and the Written Opinion of the International Searching Authority, or the Declaration, International Filing Date: Jun. 17, 2014; International Application No. PCT/US2014/042748; 10 pages.

Alberta Sulphur Research Ltd., Chalk Talk, "A Semi-Annual Presentation of Research Highlights", University of Research Centre, Calgary, Alberta, Canada, Jun. 24, 2009, 51 pages.

Alberta Sulphur Research Ltd., Chalk Talk, "A Semi-Annual Presentation of Research Highlights", The Fairmont Pallister Hotel, Calgary, Alberta, Canada, Jan. 21, 2010, 58 pages.

Alberta Sulphur Research Ltd., Chalk Talk, "A Semi-Annual Presentation of Research Highlights", University of Research Centre, Calgary, Alberta, Canada, Jun. 23, 2010, 49 pages.

P.D. Clark and D. Cicerone, "Liquid Sulphur Degassing: Fundamentals and New Technology Development in Sulphur Recovery" 20 pages, No date.

* cited by examiner

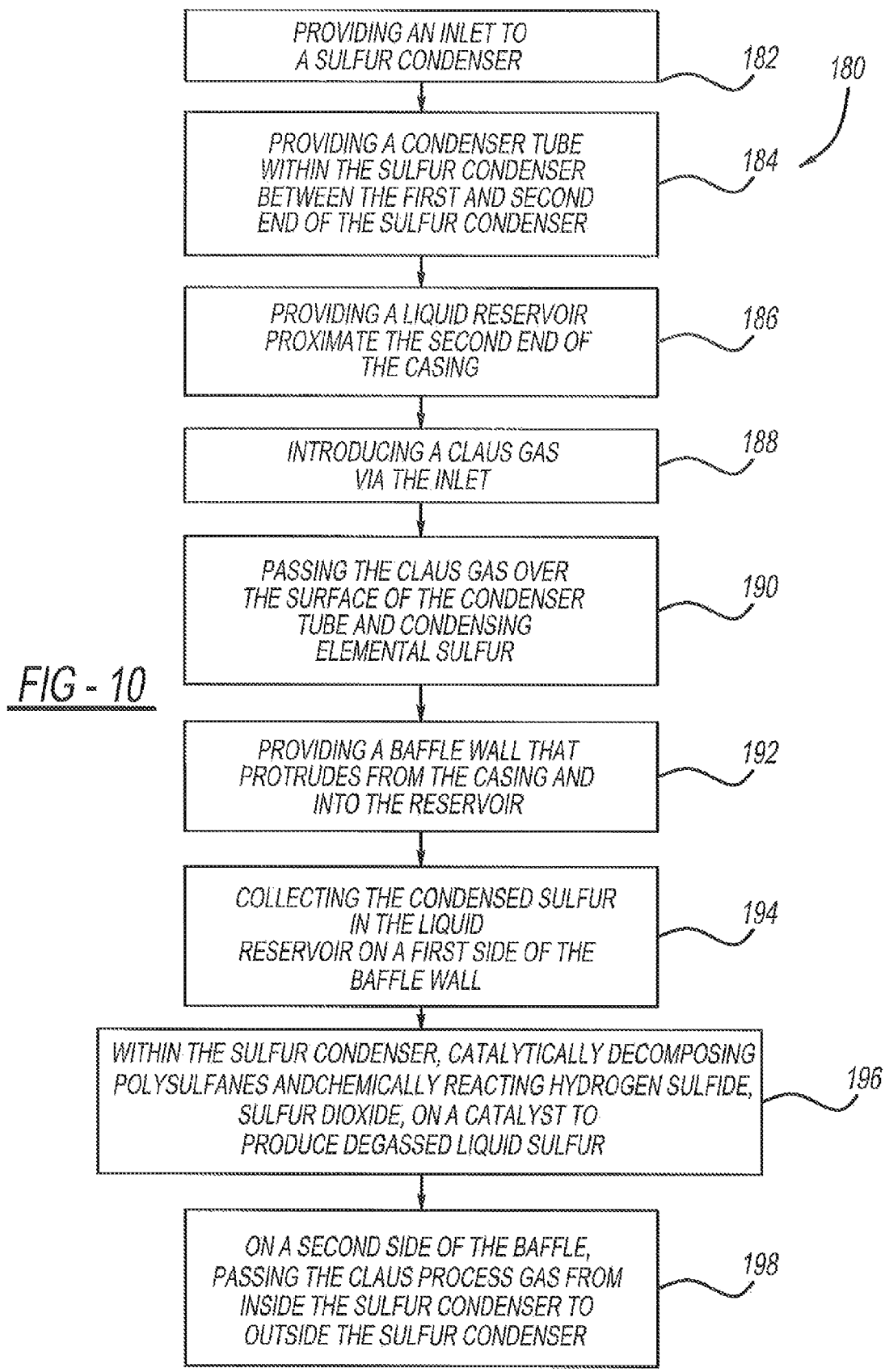

PROCESS FOR IN-SITU PRODUCTION OF LOW DISSOLVED HYDROGEN SULFIDE, DEGASSED, SULFUR FROM CLAUS SULFUR RECOVERY

CROSS-REFERENCE TO RELATED APPLICATIONS

This application is a non-provisional application which claims benefit under 35 USC §119(e) to U.S. Provisional Application Ser. No. 61/837,927 filed Jun. 21, 2013, entitled "APPARATUS FOR IN-SITU PRODUCTION OF LOW DISSOLVED HYDROGEN SULPHIDE, DEGASSED, SULFUR FROM CLAUS SULFUR RECOVERY," and to U.S. Provisional Application Ser. No. 61/837,944 filed Jun. 21, 2013, entitled "APPARATUS FOR IN-SITU PRODUCTION OF LOW DISSOLVED HYDROGEN SULPHIDE, DEGASSED, SULFUR FROM CLAUS SULFUR RECOVERY," and to U.S. Provisional Application Ser. No. 61/837,950 filed Jun. 21, 2013, entitled "PROCESS FOR IN-SITU PRODUCTION OF LOW DISSOLVED HYDROGEN SULPHIDE, DEGASSED, SULFUR FROM CLAUS SULFUR RECOVERY," and to U.S. Provisional Application Ser. No. 61/837,958 filed Jun. 21, 2013, entitled "PROCESS FOR IN-SITU PRODUCTION OF LOW DISSOLVED HYDROGEN SULPHIDE, DEGASSED, SULFUR FROM CLAUS SULFUR RECOVERY," and to U.S. Provisional Application Ser. No. 62/010,766 filed Jun. 11, 2014, entitled "PROCESS FOR DEGASSING CONDENSED SULFUR FROM A CLAUS SULFUR RECOVERY SYSTEM", all five of which are incorporated herein by reference in their entirety.

STATEMENT REGARDING FEDERALLY SPONSORED RESEARCH OR DEVELOPMENT

None.

FIELD OF THE INVENTION

This invention relates to a sulfur condenser structure and process of using the structure. The sulfur condenser process utilizes a catalyst in producing a liquid sulfur product containing sufficiently low levels of dissolved hydrogen sulfide without requiring the use of an external degasser.

BACKGROUND OF THE INVENTION

While current Claus sulfur condenser structures have proven satisfactory for condensing sulfur, there is a need for improvement in the quality of the sulfur condensed. FIG. 1 depicts a prior art vertical Claus sulfur condenser 2 in which Claus process gas 4 from a reaction furnace or a catalytic reactor enters condenser 2, passes through tubes 6, which are submerged in a cooling media, which is usually boiling water. At a bottom location, Claus process gas 8 then exits vertical Claus sulfur condenser 2 to a downstream reaction stage. Boiling water 10 may enter Claus sulfur condenser 2 at a location 12 and exit at a location 14 to aid in condensing within Claus sulfur condenser 2. Condensed liquid sulfur 16 drains from inside tubes 6 and falls to a bottom Claus sulfur condenser 2 and exits through a bottom location 18.

FIG. 2 depicts a prior art horizontal Claus sulfur condenser 20 in which Claus process gas 22 from a reaction furnace or a catalytic reactor enters condenser 20 at a location 23, passes through tubes 24 submerged in a cooling liquid, which is usually boiling water. Claus process gas 22 then exits at a location 25 to a downstream reaction stage. Water 26 enters Claus sulfur condenser 20 at a location 28 and exits at a location 30 to aid in condensing Claus process gas 22 within tubes 24 of Claus sulfur condenser 20. Liquid sulfur 32 that condenses within tubes 24 then falls and exits Claus sulfur condenser 20 through a bottom location 34.

During the process of conventional Claus sulfur recovery, a liquid sulfur product is produced that by the nature of the sulfur condensation process incorporates reactant hydrogen sulfide ($H_2S$) into the sulfur as simple dissolved $H_2S$ and chemically bound $H_2S$ in the form of sulfanes, $H_2S_x$, (with x>1). Traditionally, sulfur containing dissolved $H_2S$ and $H_2S_x$ stored for periods of time outside the Claus process will eventually lose the $H_2S$ to the gas above the sulfur liquid level in the storage vessel, such as a truck, rail car, tank, or underground pit. Sulfur in storage emanates the dissolved $H_2S$ from product sulfur because of the low solubility of simple dissolved $H_2S$ at ordinary liquid sulfur storage temperatures (250 F to 318 F), and the thermodynamic instability of the sulfanes with respect to $H_2S$ and elemental sulfur. Accumulations of emanated $H_2S$ can lead to unintended exposures during loading of sulfur and during storage of sulfur in open air containers, such as underground concrete pits that facilitate gravity drainage or tanks vented with air. Emanated $H_2S$ can also cause undesired mixtures to form in open air storage vessels.

Disposing of emanated $H_2S$ is another issue. Incinerating emanated $H_2S$ near or in front of a Claus sulfur plant stack generates $SO_2$ emissions that are monitored for environmental compliance. In some instances, up to half of the reported emissions from a Claus sulfur recovery plant and Claus Tail Gas Cleanup unit can come from $H_2S$ emanated from liquid sulfur in storage. Under certain circumstances, these additional emissions may limit the sulfur processing capability of the Claus/TGU unit.

What is needed then is a device and process that does not suffer from the above disadvantages.

BRIEF SUMMARY OF THE DISCLOSURE

A vertical sulfur condenser may employ an exterior casing, a plurality (e.g. more than one) of condenser tubes arranged longitudinally within the casing, a reservoir of liquid sulfur with a surface at a longitudinal end of the vertical sulfur condenser. A condenser tube wall (e.g. an end of one of more tubes) may protrude from a sealing tube sheet within the overall heat exchanger and into and below a surface of the reservoir of liquid sulfur. A Claus process gas inlet may reside at an end of the condenser that is opposite to the reservoir of liquid sulfur and a Claus process gas may pass through the inside of the tubes where elemental sulfur from the Claus reaction, $2H_2S+SO_2 \Leftrightarrow 3/xSx+2H_2O$ (Equation 1), is removed from the gas by condensation. The plurality of tubes may be surrounded by boiling water to facilitate condensation within the plurality of tubes. A Claus process gas outlet may be located between the liquid sulfur reservoir surface or level and the portion of the condenser tubes surrounded by boiling water. An exterior casing of the vertical sulfur condenser may be arranged such that condensed liquid collects on an interior surface of the plurality of condenser tubes. The collection of liquid sulfur within the vertical sulfur condenser tubes may be at least partially a gravity assisted collection within the exterior casing. A liquid sulfur outlet may be located to establish the elevation of the surface of the reservoir of liquid sulfur.

A horizontal sulfur condenser having an exterior casing may contain one or more condenser tubes arranged longitudinally and parallel to the casing and each other in a horizontal orientation. A liquid sulfur reservoir may reside at a longitudinal end of the sulfur condenser and may have a liquid sulfur surface. A rigid baffle may protrude into the sulfur reservoir from a casing wall opposite the sulfur reservoir. The baffle clearance (e.g distance from the free baffle tip to the reservoir bottom), and liquid sulfur outlet height need to be arranged to maintain a liquid level greater than the baffle clearance so as to force process gas through the liquid sulfur reservoir. The arrangement also requires the bottom of the bottom row of tubes to be above the top of the liquid sulfur outlet nozzle to prevent liquid sulfur from going backward in the tubes and filling them with liquid sulfur. The horizontal sulfur condenser may further include a Claus process gas inlet proximate a first end of the plurality of condenser tubes opposite an end of the horizontal sulfur condenser where the sulfur reservoir is located. The plurality of condenser tubes may be positioned above the sulfur reservoir, yet not necessarily directly over or directly on top of sulfur reservoir. The liquid sulfur outlet may be selectively positioned to establish a liquid sulfur surface of the sulfur reservoir. The baffle creates multiple chambers (e.g. two chambers) above the sulfur reservoir. A first chamber may be defined by the exterior casing, liquid reservoir, baffle and be next to or receive ends of condenser tubes, and a second chamber may be defined by the exterior casing, liquid reservoir and the baffle.

A process of producing degassed liquid sulfur, such as in a vertical sulfur condenser, may include providing a Claus process gas inlet to a casing of a sulfur condenser, introducing a Claus process gas into the sulfur condenser, and providing a condenser tube that protrudes into a liquid reservoir. The liquid reservoir may be a mixture of liquid sulfur and a catalyst. The process may further include passing the Claus process gas through the condenser tubes, condensing elemental sulfur containing dissolved $H_2S$ and chemically reacted $H_2S$ in the form of $H_2S_x$ (where x>1) from the Claus process gas on the condenser tube, and collecting the contaminated condensed Claus sulfur in the liquid reservoir. The process may further include passing the cooled process gas and condensed sulfur from the tubes through the reservoir of liquid sulfur containing the catalyst creating a contacting zone for the process gas, contaminated sulfur, and the catalyst facilitating the contact between the liquid sulfur in the reservoir, the catalyst, and the remaining Claus process gas causing catalytic decomposition of the polysulfanes to $H_2S$ and sulfur and reaction on the catalyst between hydrogen sulfide and sulfur dioxide to form sulfur and water vapor thereby producing degassed liquid sulfur. The liquid reservoir with degassed liquid sulfur may be drained and the Claus process gas may be passed downstream.

A process of producing degassed liquid sulfur within a vertical sulfur condenser may also include introducing a Claus process gas through a gas inlet of an external casing of the sulfur condenser; providing a plurality of condenser tubes within the external casing; submerging exit ends of the plurality of condenser tubes within a liquid reservoir resulting in submerged exit ends of the plurality of condenser tubes; passing the Claus process gas into an inlet end of the plurality of condenser tubes; condensing the Claus process gas within the plurality of condenser tubes to produce condensed Claus process gas within the plurality of condenser tubes; and collecting the condensed Claus process gas in the liquid reservoir upon exiting of the condensed Claus process gas proximate an exit end of the plurality of condenser tubes. Condensing the Claus process gas within the plurality of condenser tubes to produce condensed Claus process gas may further comprise converting hydrogen sulfide by the Claus reaction $2H_2S+SO_2 \Leftrightarrow 3/xSX+2H_2O$, and decomposing polysulfanes to hydrogen sulfide and sulfur, wherein elemental sulfur is freed from hydrogen sulfide. Still yet, the process may include providing the gas inlet at a first end of the sulfur condenser; and providing the liquid reservoir at a second end of the sulfur condenser.

The process may further comprise providing a first tube sheet between and thereby joining the plurality of condenser tubes to each other and the external casing of the sulfur condenser proximate the inlet end of the plurality of condenser tubes thereby creating a sealed end to contain liquid. The process may further comprise providing a second tube sheet between the plurality of condenser tubes and the external casing of the sulfur condenser at an intermediate location along the plurality of condenser tubes thereby creating a liquid sealed end like the opposite end. Next, the process may comprise surrounding an exterior of the plurality of condenser tubes with boiling water between the first tube sheet and the second tube sheet via an inlet; forcing uncondensed Claus process gas and the condensed elemental sulfur through the plurality of condenser tubes and from the submerged exit ends of the plurality of condenser tubes and into the liquid reservoir; generating Claus process gas bubbles within the liquid reservoir; forcing the Claus process gas bubbles from an inside of the plurality of condenser tubes to an exterior of the plurality of condenser tubes; and producing degassed liquid sulfur within the liquid reservoir. The process may also comprise providing a Claus process gas outlet through the external casing of the sulfur condenser between the liquid reservoir and the second tube sheet; passing the Claus process gas from inside the sulfur condenser to outside the sulfur condenser through the Claus process gas outlet; providing a degassed liquid sulfur outlet through the casing of the sulfur condenser; and passing the degassed liquid sulfur from inside the sulfur condenser to outside the sulfur condenser through the degassed liquid sulfur outlet. The liquid reservoir is a mixture of the condensed Claus process gas liquid sulfur and a catalyst, while the condensed Claus process gas may contain elemental sulfur.

In another example, a process of producing degassed liquid sulfur within a sulfur condenser may comprise introducing a Claus process gas into the sulfur condenser through a Claus process gas inlet of a casing of the sulfur condenser; passing the Claus process into an entrance end of a condenser tube, through the condenser tube, and from a submerged exit end of the condenser tube residing in a liquid reservoir that is a mixture of a liquid sulfur and a catalyst; condensing elemental sulfur on an interior surface of the condenser tube as the Claus process gas is passing through the condenser tube to produce liquid sulfur on an interior surface of the condenser tube; passing the liquid sulfur directly into the liquid reservoir within the sulfur condenser; generating a plurality of Claus process gas bubbles within the liquid reservoir containing a catalyst; and passing the plurality of Claus process gas bubbles from the liquid reservoir and into a gaseous chamber above the liquid sulfur reservoir. The process may further comprise providing a Claus process gas outlet to a casing of the sulfur condenser above the liquid sulfur reservoir; passing the Claus process gas from the chamber above the liquid sulfur reservoir to outside the sulfur condenser through the Claus process gas outlet; passing the liquid sulfur from inside the sulfur condenser to outside the sulfur condenser through a liquid sulfur outlet. Within the sulfur condenser, the process may further comprise causing a chemical reaction in the liquid reservoir between hydrogen sulfide, sulfur dioxide, and a catalyst to produce degassed liquid sulfur.

A process of producing degassed sulfur, such as in a horizontal sulfur condenser, may include providing a Claus process gas inlet in a first end of a casing of a sulfur condenser, providing a Claus process gas outlet in a second end of the casing of the sulfur condenser, providing a condenser tube within the sulfur condenser between the first end and the second end of the sulfur condenser, providing a liquid reservoir proximate a second end of the casing, introducing a Claus process gas into the sulfur condenser through the Claus process gas inlet, then passing the Claus process gas through the condenser tube from the first end of the casing toward the second end. The second end of the casing may form a wall of the liquid reservoir. Next, condensing the Claus process gas within the condenser tube produces condensed elemental sulfur that flows or drains into the liquid reservoir. The process may further entail providing a baffle wall that protrudes from the casing above the liquid reservoir and that protrudes into the liquid reservoir. Collecting the condensed Claus sulfur in the liquid reservoir on a first side of the baffle wall in the liquid reservoir will facilitate contact between the liquid sulfur in the reservoir, the catalyst, and the remaining Claus process gas causing catalytic decomposition of the polysulfanes to $H_2S$ and sulfur and reaction on the catalyst between hydrogen sulfide and sulfur dioxide to form sulfur and water vapor thereby producing degassed liquid sulfur. On a second side of the baffle, passing the Claus process gas from inside the sulfur condenser to outside the sulfur condenser through the Claus process gas outlet permits downstream processing of the Claus process gas.

BRIEF DESCRIPTION OF THE DRAWINGS

A more complete understanding of the present invention and benefits thereof may be acquired by referring to the follow description taken in conjunction with the accompanying drawings in which:

FIG. 10 is a flowchart depicting steps in a process of operating a Claus sulfur condenser in accordance with the present teachings.

DETAILED DESCRIPTION

Figure 1:
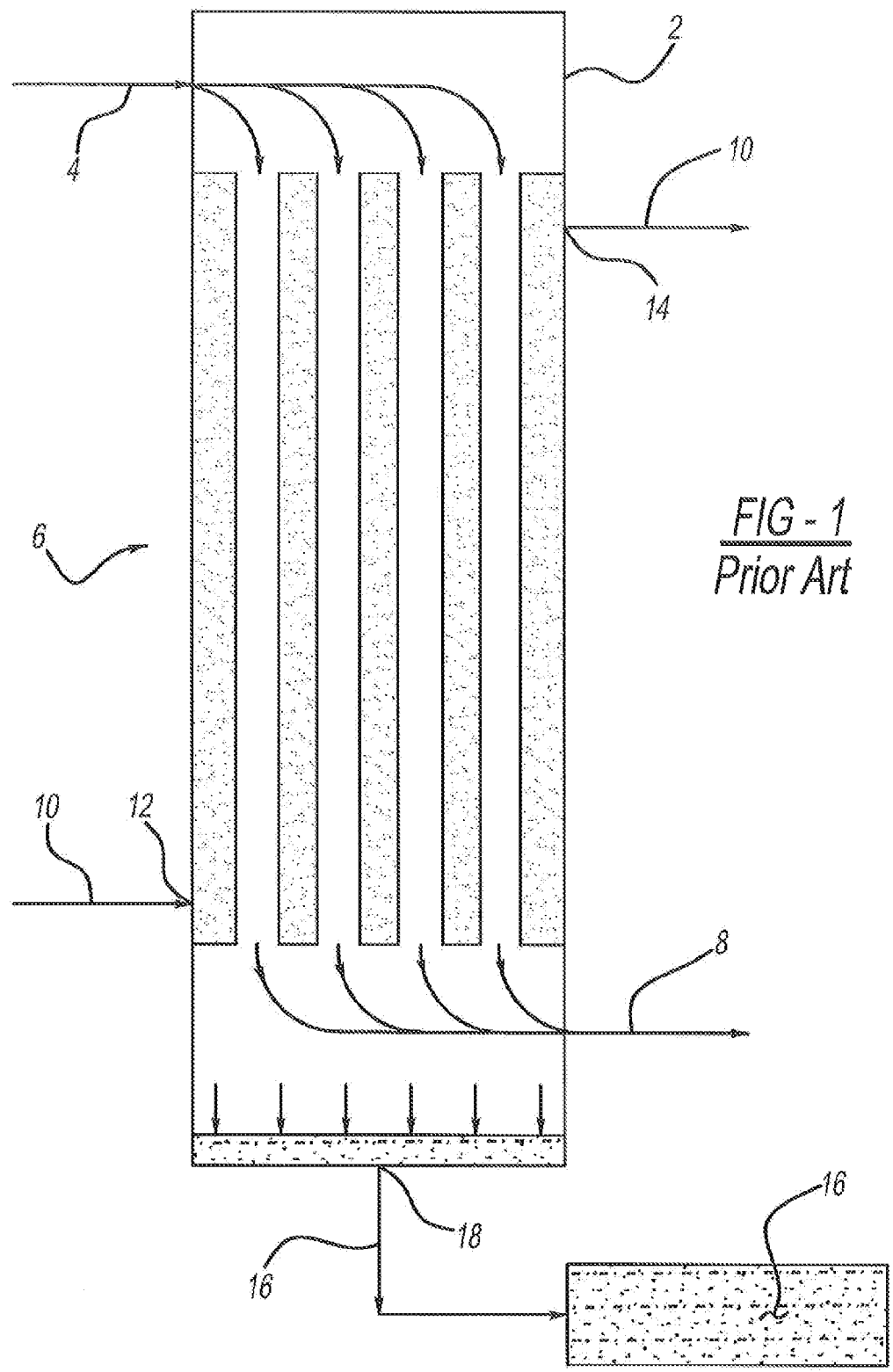
FIG. 1 is side internal view of a vertical Claus sulfur condenser according to the prior art.
Figure 2:
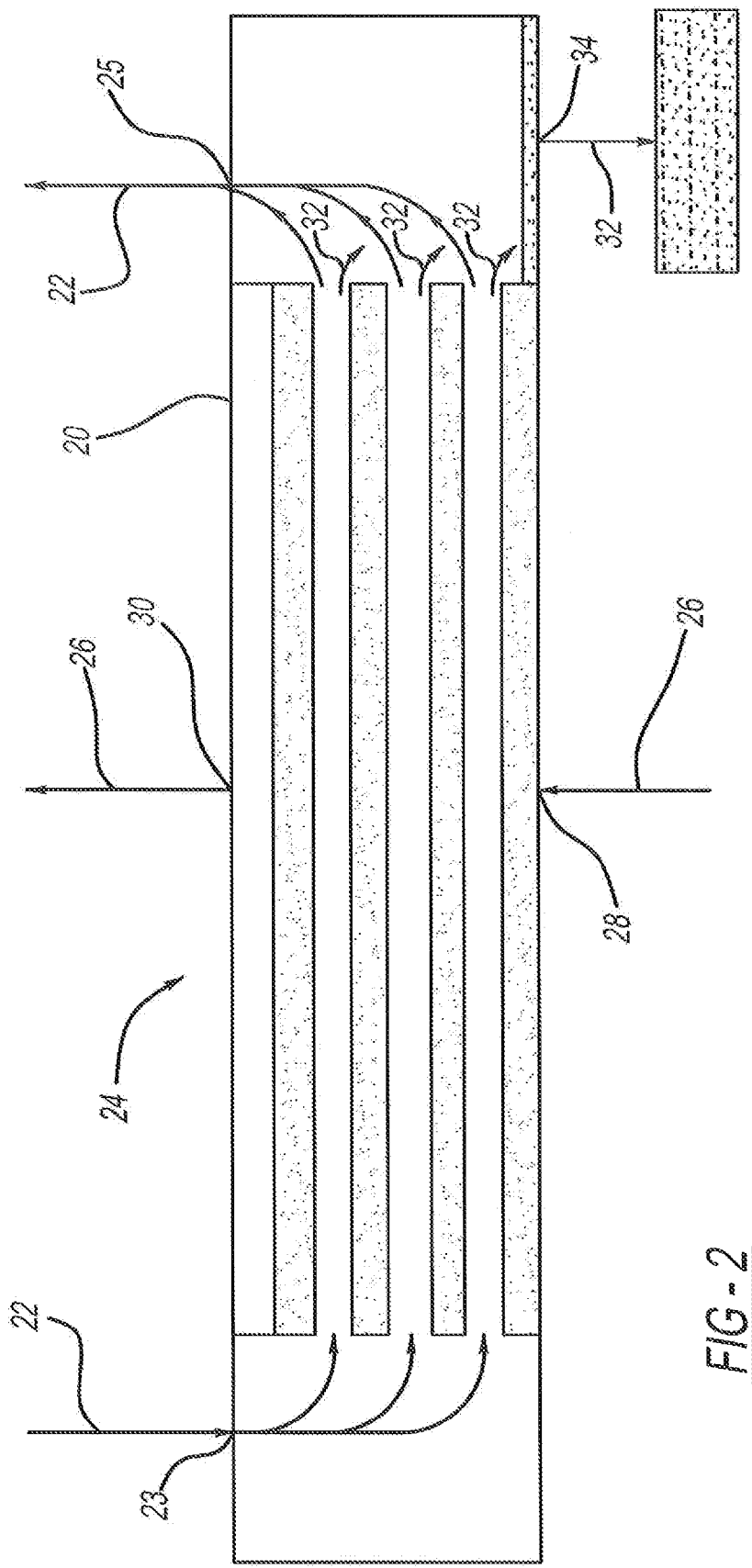
FIG. 2 is side internal view of a horizontal Claus sulfur condenser according to the prior art.
Figure 3:
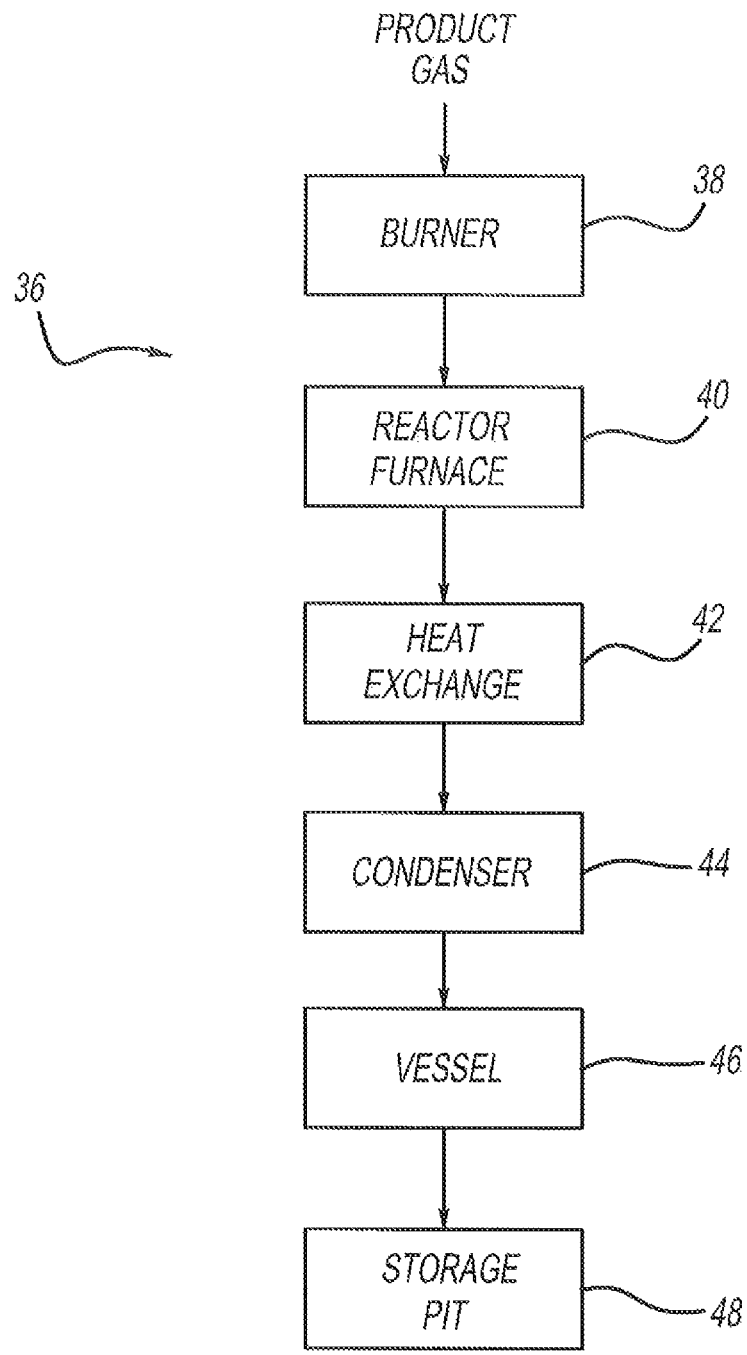
FIG. 3 is a flowchart depicting major components of a sulfur recovery process, including a condenser in accordance with the teachings of the present disclosure.

In conjunction with FIGS. 3-10, exemplary embodiments and processes of the present disclosure will be explained. FIG. 3 is an overall schematic depicting components of the teachings of the present disclosure, including condenser 44, which may be a vertical or horizontal Claus sulfur condenser as depicted in FIGS. 4-8. In a Claus sulfur recovery process 36, a burner 38 receives feed acid gas and either air or a combination of air and pure oxygen. Combustion products of the exothermic reaction evolve into a reaction furnace 40 where endothermic reactions of the Claus process take place. The effluent from reaction furnace 40 passes through a heat exchanger 42 where it is cooled, and then to a condenser 44. Liquid sulfur condenses and may be introduced into a vessel 46, which may be a float type trap or barometric seal leg used to maintain pressure on the process gases. Liquid sulfur may then pass into an underground sulfur storage pit 48 or an above ground tank. Although FIG. 3 depicts a Claus process 36 with only one reactor furnace 40, process 36 may include more than one reactor in series so that the effluent from condenser 44 may be directed through a line to additional catalytic Claus reactors. In a scenario where there is more than one Claus reaction stage, effluent from the last condenser typically flows to a tail gas coalescer to separate droplets of entrained liquid sulfur from the tail gases. The tail gases may also be treated to further increase the sulfur recovery of the process.

Figure 4:
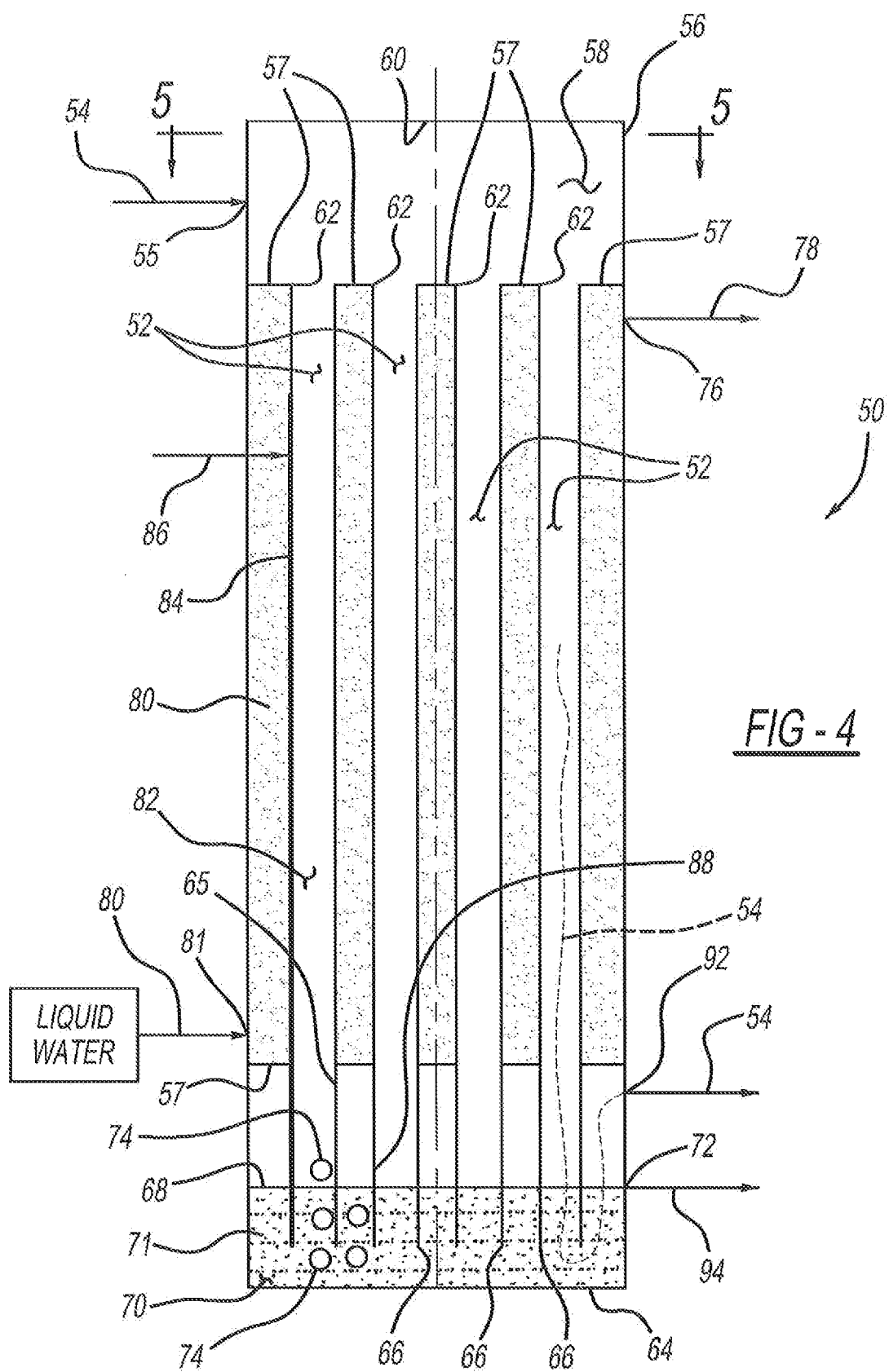
FIG. 4 is an internal side view of a vertical sulfur condenser in accordance with the teachings of the present disclosure.
Figure 5:
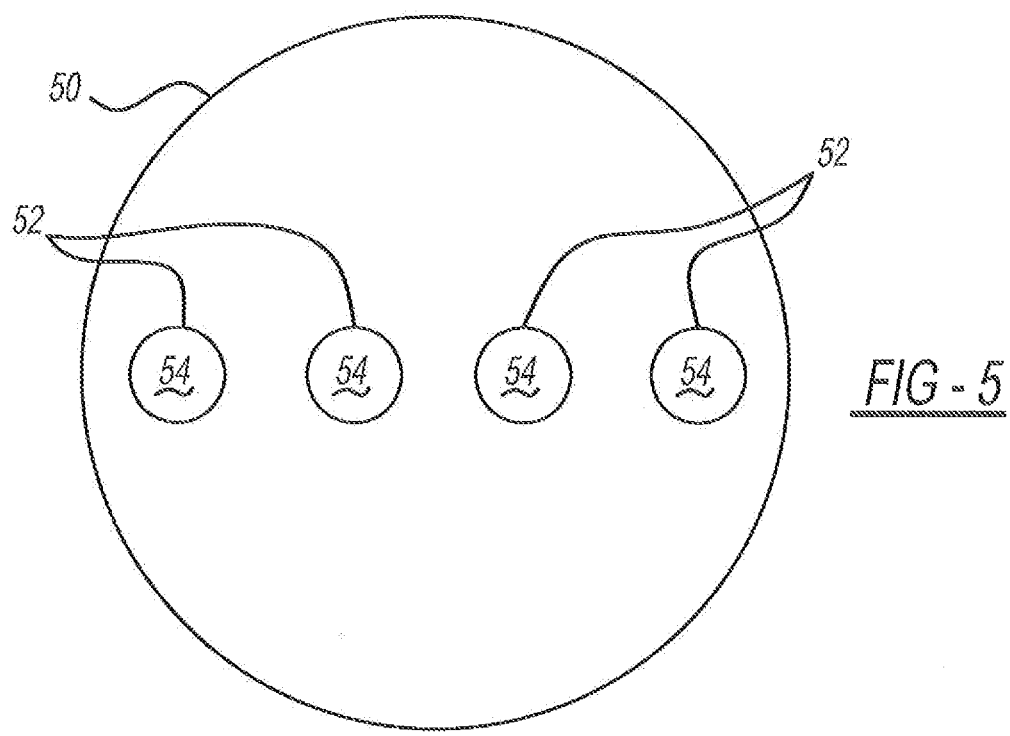
FIG. 5 is a cross-sectional view of the vertical sulfur condenser taken at line 5-5 of FIG. 4.

FIG. 4 depicts a vertical sulfur condenser 50 in accordance with the present teachings. Vertical sulfur condenser 50 is so called because it (e.g. its longitudinal axis) is oriented perpendicular to level ground. Vertical sulfur condenser 50 may also be so called because condenser tubes 52 may be aligned such that if extended indefinitely, one end of condenser tubes 52 would extend generally perpendicularly into the Earth while the opposite end would generally extend into the sky. Condenser tubes 52 may be completely straight with no bends or turns and are surrounded by a cooling media, which is usually boiling water. Claus process gas 54 from a reaction furnace or a catalytic reactor may enter vertical sulfur condenser 50 at an inlet 55 at an end 56, which may have an empty space 58 (e.g. void of structure), between an end wall 60 of vertical sulfur condenser 50 and a longitudinal end 62 of each of condenser tubes 52. Claus process gas 54 passes within condenser tubes 52, and coolant 80 passes outside of tubes 52 and contacts tubes 52, but the coolant 80 is contained by an outer wall or casing of condenser 50 and tube sheet 57 that is perpendicular to tubes 52 and joins tubes 52. At an end wall 64 of vertical sulfur condenser 50 that is opposite vertical condenser end wall 60, condenser tubes 52 within vertical sulfur condenser 50 extend such that a condenser tube end 66 of each of condenser tubes 52 protrudes below a surface 68 of liquid sulfur 70, which has a catalyst 71 in it. The catalyst 71 within liquid sulfur 70 may be one of a variety of forms including pills, pellets, tri-lobes, or any of a variety of particle shapes. Catalysts may be made of high surface alumina oxide such as a gamma alumina Claus Catalyst, more dense alumina support material wash coated with high surface area alumina or iron oxides enabling the particles to be contacted by incoming condensed sulfur and process gases throughout the liquid sulfur at the bottom of the exchanger, without floating on the surface, or wash-coated ceramic foam monoliths fixed into the structure of the condenser in a zone that allows contact between the sulfur held up at the bottom of the condenser, sulfur condensed in the exchanger, and process gas from the exchanger. The depth of sulfur maintained above condenser tube end 66, which is also a condenser tube outlet, should be minimized to keep pressure drop to a minimum due to the pressure drop restrictions imposed by the normal operation of the Claus process.

Continuing with FIG. 4, a liquid sulfur outlet nozzle 72 may control a position of surface 68 of liquid sulfur 70. Process gas bubbles 74 form within and rise through liquid sulfur 70 agitating the liquid sulfur and the catalyst exiting surface 68 of liquid sulfur 70 to above and over liquid sulfur 70 and between and around an outside surface of condenser tubes 52. Process gas bubbles 74, which are Claus process gas bubbles, may exit vertical sulfur condenser 50 via outlet 92 (e.g. a nozzle) as a gas stream 54 that is sent to a downstream process. A steam and water separator nozzle 76 may be located near or proximate condenser tube longitudinal end 62 to bleed off, release or drain steam and/or water 78 to a downstream separator unit. An example pressure range at nozzle 76 may be 15-65 psig to control the temperature of the sulfur in condenser 50 to prevent the formation of solid sulfur or to reverse the effects of degassing. Liquid water 80 may enter vertical sulfur condenser 50 via an inlet 81, which may be a valve or nozzle.

Claus process gas 54 from a cooling section of heat exchanger 42 enters vertical sulfur condenser 50 proximate a highest end of vertical sulfur condenser 50, such as near end wall 60. Claus process gas 54 that has passed through vertical sulfur condenser 50 may have components of Sulfur (S), Sulfur dioxide ($SO_2$), hydrogen sulfide ($H_2S$), water ($H_2O$), nitrogen ($N_2$), carbon monoxide (CO), and carbon dioxide ($CO_2$). After entering vertical sulfur condenser 50, Claus process gas 54 proceeds inside condenser tubes 52 which, at one end, extend or protrude from the tube sheet 57 and at an opposite tube end 66, into the liquid sulfur 70 surrounding tube ends 66. More specifically, and with reference to FIGS. 5 and 6, as applicable, vertical condenser tubes 52 of vertical sulfur condenser 50 may be arranged similarly to heat exchanger tubes as known to those skilled in the art. During passage of Claus process gas 54 inside and through a length of condenser tubes 52, hydrogen sulfide may be incorporated into condensed sulfur deposited on condenser tubes 52. Numeral 86 and its leader-arrow in FIG. 4 point to the incorporation of hydrogen sulfide in condensed sulfur, which collects on the inside surface of condensing tubes 52 during passage of Claus process gas 54 through an interior of condenser tubes 52. As Claus process gas passes through the inside of condenser tubes 52 where elemental sulfur from the Claus reaction, $2H_2S+SO_2 \Leftrightarrow 3/xSx+2H_2O$ (Equation 1), is removed from the gas by condensation.

Figure 6:
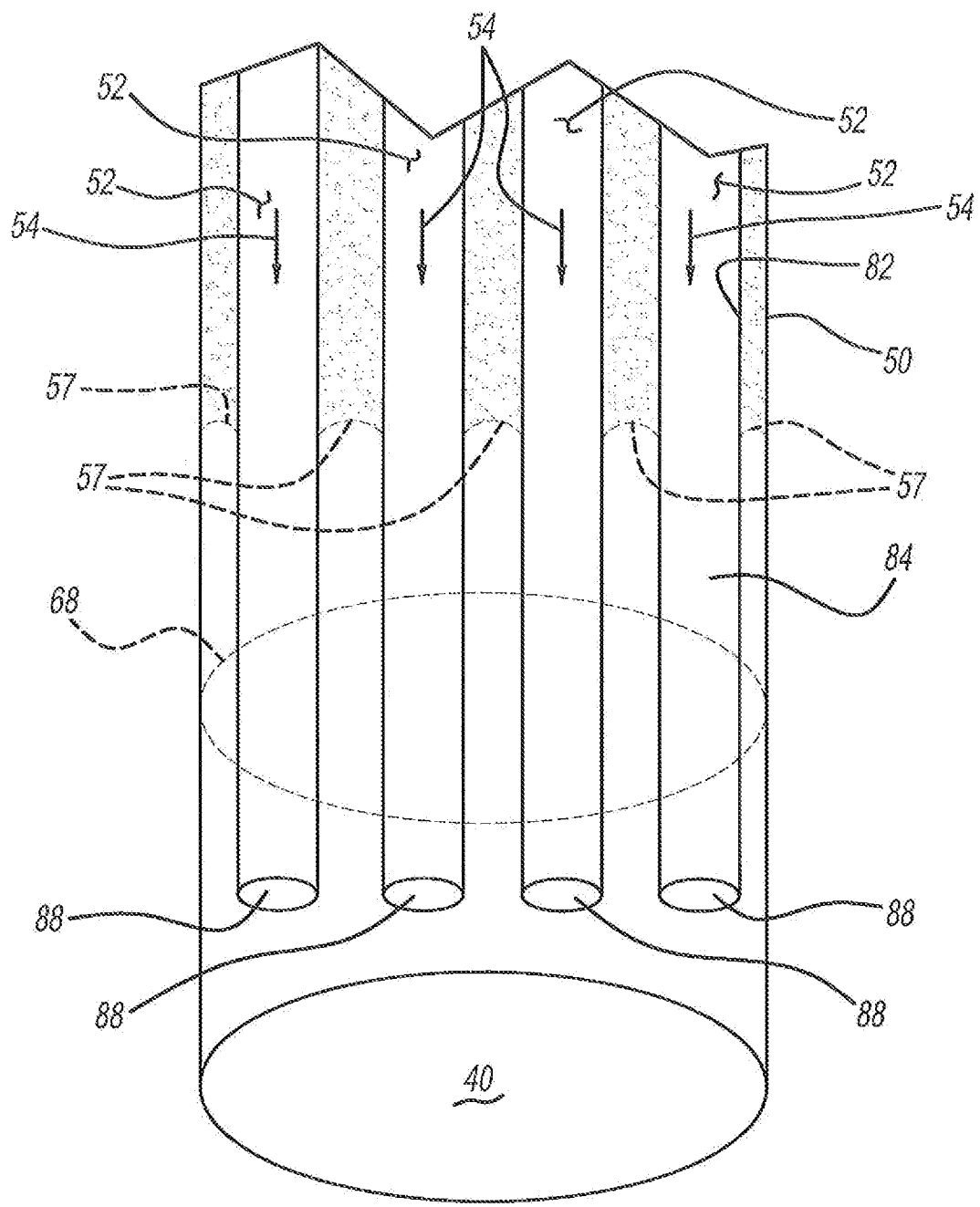
FIG. 6 is a perspective view from an end of a vertical sulfur condenser in accordance with the present teachings.

FIGS. 4 and 6 depict arrangements of condenser tubes 52 such that each of condenser tubes 52 has a Claus process gas interior passage portion 82 and an exterior portion 84 that is in contact with water 80. Interior passage portion 82 of condenser tubes 52 is open at both ends to permit passage of Claus process gas 54, while a separate tube sheet 57 proximate at each end of condenser tubes 52 prevents water from flowing into empty space 58 at one end, and from flowing into reservoir of liquid sulfur 70 at a second end. However, as depicted, a portion 65 of condenser tubes 52 extends so that it protrudes into liquid sulfur 70 and below a surface 68 of liquid sulfur 70. Open end 88 of condenser tube 52 permits liquid sulfur and Claus process gas to flow into liquid reservoir 70. Thus, tube sheets 57 form a seal to keep water 80 in a steam generation (shell side) section of the condenser from entering the head spaces 58 at either end of tubes 52 and near ends of vertical sulfur condenser. Sulfur condenses from the gas stream on the inside surface of tubes 52 and flows down an interior of tube 52 and into reservoir of liquid sulfur 70 while process gas 54 flows co-currently to liquid sulfur 70. Because condensed sulfur (phase 1) and flowing process gas 54 (phase 2) become separated inside condenser tubes 52, agitation within liquid reservoir 70 causes the two phases back together, but in the presence of a catalyst to perform degassing.

Figure 7:
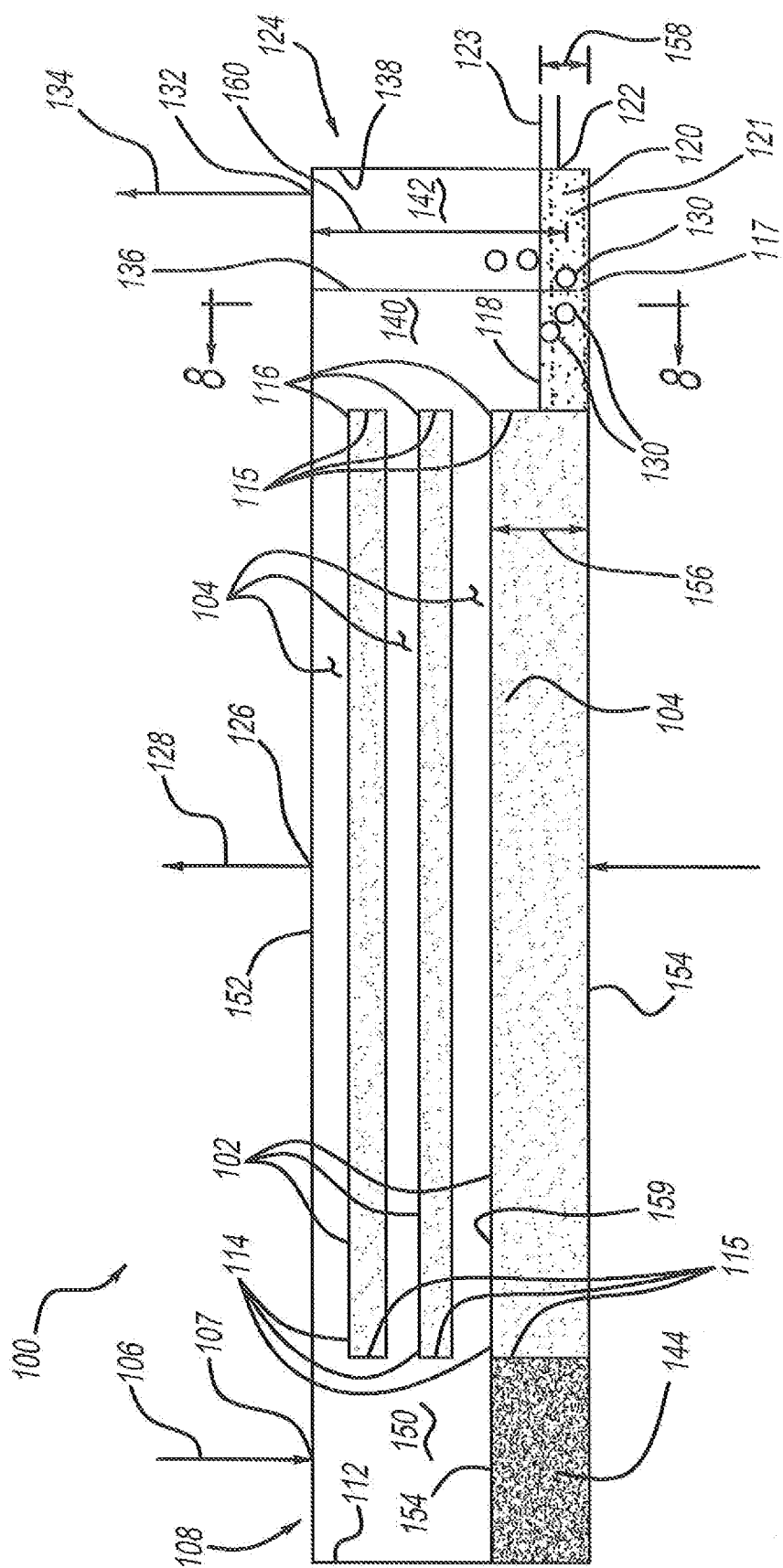
FIG. 7 is a side view of a horizontal sulfur condenser in accordance with the teachings of the present disclosure.

FIG. 7 is an embodiment of a horizontal sulfur condenser 100, which is so called because internal condenser tubes 102 are aligned parallel to level ground, or with a 1 to 2 degree downward slope from horizontal from the end at which Claus process gas 106 enters horizontal sulfur condenser 100 to end at which liquid sulfur and Claus process gas 106 exits horizontal sulfur condenser 100 to facilitate gravity draining of the liquid sulfur as is known to those skilled in the art. Horizontal sulfur condenser 100 may also be called such because if condenser tubes 102 are aligned such that if extended indefinitely, none of tubes 102 would extend into the Earth or the sky, but rather, they would extend generally parallel to the surface of the Earth. Internal condenser tubes 102 may be completely straight with no bends or turns. In operation, Claus process gas 106 from a reaction furnace or a catalytic reactor may enter horizontal sulfur condenser 100 at an end 108, which may have an empty header space 150, which may be void of structure and be located between an end wall 112 of horizontal sulfur condenser 100 and a longitudinal entrance end 114 of each of condenser tubes 102. Proximate an exit end of horizontal sulfur condenser 100, condenser tubes 102 within horizontal sulfur condenser 100 extend or reside such that exit end 116 of each of tubes 102 is located above, which may also be over, a surface 118 of liquid sulfur reservoir 120, which also has a catalyst 121 in it. Catalyst 121 may be the same as those described above in conjunction with vertical sulfur condenser 50.

Continuing with FIG. 7, a degassed liquid sulfur outlet 122 (e.g. a nozzle) may control a position of surface 118 of liquid sulfur reservoir 120 at end 124 of horizontal sulfur condenser 100. Horizontal sulfur condenser 100 may have a steam outlet nozzle 126, which may be located near or proximate a center of a shell side of condenser 100 to bleed off or release steam 128 to a steam collection/distribution system. Tube sheets 115 contain boiling water to facilitate condensing within internal passages 104 of tubes 102. A potential pressure range at nozzle 126 may be 15-65 psig to control the temperature of the sulfur in condenser to prevent the formation of solid sulfur or to reverse the effects of degassing. Thus, Claus process gas 106 that has passed through horizontal sulfur condenser 100 may have components of Sulfur (S), Sulfur dioxide ($SO_2$), hydrogen sulfide ($H_2S$), water ($H_2O$), nitrogen ($N_2$), carbon monoxide (CO), and carbon dioxide ($CO_2$). A baffle 136 (e.g. a wall or plate) acting as a gas-blocking wall to prevent the passage of Claus process gas 106, resides between an end 138 (e.g. a cap end wall) of horizontal sulfur condenser 100, and divides what would otherwise be a single cavernous volume into a first chamber 140 and a second chamber 142, both above and over reservoir of liquid sulfur. Baffle 136 prevents Claus process gas 106 from going to outlet 132 in second chamber 142 without first contacting the combination of liquid sulfur, which has a catalyst, as discussed above, mixed with it. Process gas bubbles 130, which are generated by forcing the Claus process gas through the liquid sulfur containing a catalyst by controlling the level of the sulfur above the bottom or tip of baffle 136, pass through liquid sulfur reservoir 120, and through gap 117 formed between baffle 136 and bottom wall of condenser 100, and from a surface 118 of liquid sulfur 120 to above and over liquid sulfur 120. In liquid sulfur 120, process gas bubbles 130 effervesce and then exit horizontal sulfur condenser 100 from second chamber 142, such as via a valve or outlet 132 as gas 134. Thus, valve or outlet 132 releases Claus process gas 134 to the next reaction stage.

Horizontal sulfur condenser 100 may have a filler material 144 situated such that a filler material top surface 146 coincides with a top surface 148 of a lowest mounted cooling tube 159. With filler material 144 occupying what would otherwise be part of empty space 150 or volume, liquid sulfur buildup at a bottom location in the horizontal sulfur condenser 100 at Claus process gas 106 entrance area is prevented. Without filler material, liquid sulfur buildup at the location of the filler material 144 depicted in FIG. 7, could be caused by gravity of Claus process gas 106 from a reaction furnace or catalytic reactor that enters horizontal sulfur condenser 100 at ninety degrees or approximately ninety degrees to a first longitudinal wall 152 of horizontal sulfur condenser 100 that is parallel to a second longitudinal wall 154 against which filler material 144 is located. Filler material 144 may be a product known for a similar purpose. With filler material 144 situated as depicted in FIG. 7 and described above, Claus process gas may easily enter empty volume 150 and along tubes 102.

In FIG. 7, horizontal sulfur condenser 100 is constructed so that the lowest condenser tube 159 within horizontal sulfur condenser 100 is at an elevation or distance 156 that is greater than the elevation or distance 158 (i.e. highest outlet point) of degassed liquid sulfur outlet tube 123 to prevent any back flow or backing-up of liquid sulfur 120 into horizontal sulfur condenser 100 (e.g. the front channel head) in the event that horizontal sulfur condenser 100 is not slightly sloped toward degassed liquid sulfur outlet tube 123. A baffle 136 is installed such that Claus process gas 106, after passing through condensing tubes 102, is force into and through liquid sulfur reservoir 120 at the bottom of horizontal sulfur condenser 100 to come into contact with catalyst 121 in the liquid sulfur. The catalyst properties and arrangement are similar or the same as those described in conjunction with vertical sulfur condenser 50, previously described. Length 160 of baffle 136 should be determined to allow sufficient contact between the catalyst, sulfur within liquid sulfur reservoir 120, Claus process gas 106, and condensed sulfur without causing undue pressure drop within horizontal sulfur condenser 100. Length 160 of baffle 136 may extend from longitudinal wall 152, which is opposite to and farthest from liquid sulfur reservoir 120, to a depth into liquid sulfur reservoir 120, which is below a surface 118 of liquid sulfur reservoir 120.

Figure 8:
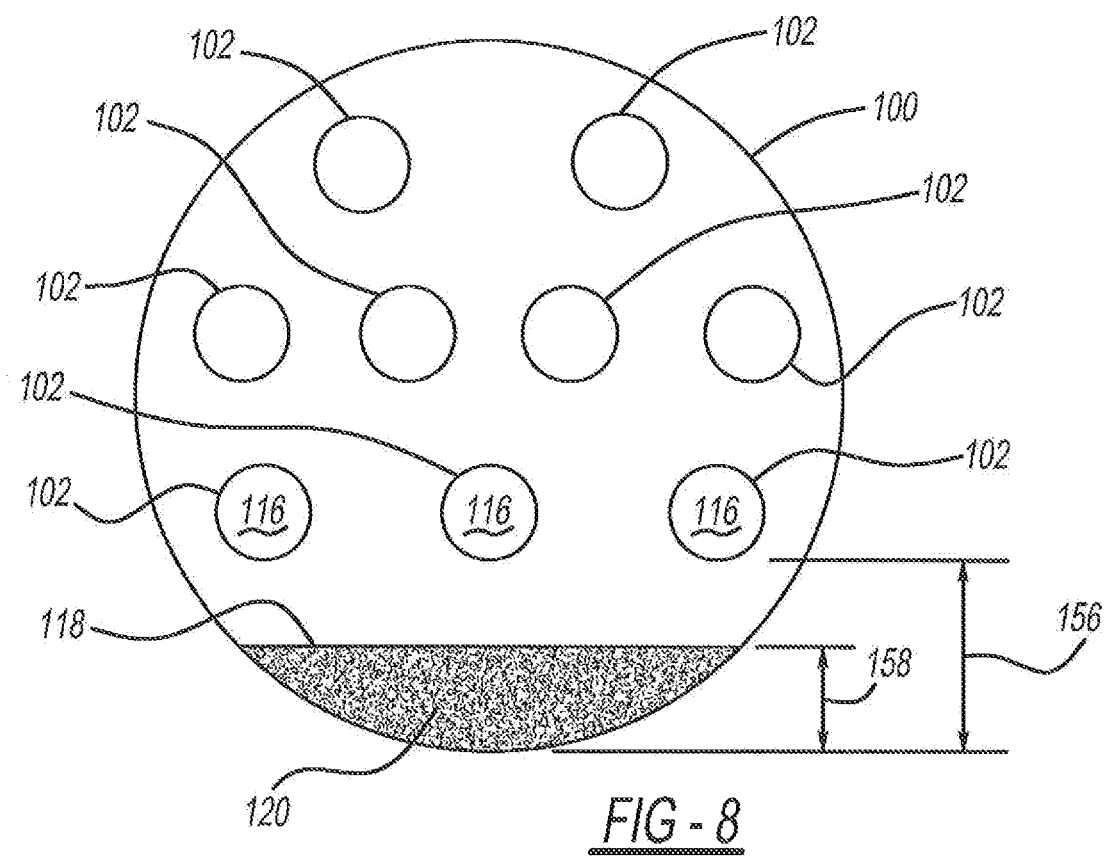
FIG. 8 is a cross-sectional view of the horizontal sulfur condenser taken at line 8-8 of FIG. 7.

FIG. 8 is a cross-sectional view of horizontal sulfur condenser 100 with the section taken through liquid sulfur reservoir 120. FIG. 8 depicts how condensing tubes 102 may be arranged, and how liquid sulfur reservoir 120 and its surface 118 may be positioned relative to tubes 102. Moreover, FIG. 8 depicts how distance 158 from a bottom of horizontal sulfur condenser 100 to a top surface 118 of liquid sulfur reservoir 120 is less than a distance 156 from a bottom of horizontal sulfur condenser 100 to the closest condensing tube 102.

Thus, a vertical sulfur condenser 50 may employ an exterior casing, a plurality (e.g. more than one) of condenser tubes 52 arranged longitudinally within the casing, a reservoir of liquid sulfur 70 with a surface 68 at a bottom longitudinal end of vertical sulfur condenser 50. Condenser tube ends 66 may protrude into and below surface 68 of reservoir of liquid sulfur 70. A Claus process gas inlet 55 at condenser end 56 that is opposite to reservoir of liquid sulfur 70 may be proximate end wall 60 of condenser tubes 52. A tube sheet 57 creates a seal with condenser tubes 52 to permit water to be secured around condenser tubes 52 and not leak into header end spaces at each end of condenser 50. A Claus process gas outlet 92 may be located between liquid sulfur surface 68 and tube sheet 57 of condenser tubes 52. A longitudinal central axis of vertical sulfur condenser 50 may be arranged such that it is situated vertically. The collection of liquid sulfur within vertical sulfur condenser is a gravity assisted collection within the exterior casing. Liquid sulfur outlet 72 may be located at surface 68 of reservoir of liquid sulfur 70.

Thus, a horizontal sulfur condenser 100 having an exterior casing may contain one or more condenser tubes 102 arranged longitudinally in a horizontal orientation. Sulfur reservoir 120 with a liquid sulfur surface 118 may reside at a longitudinal end 138 of sulfur condenser 100. Baffle 136 may protrude into sulfur reservoir 120. The plurality of condenser tubes 102 may be parallel to the casing. The lowest condenser tube 159 is located a first tube distance 156 from wall 154 forming part of the casing such that liquid sulfur reservoir 120 has a depth so that the distance of liquid sulfur surface 118 to wall 154 of the casing is less than the first tube distance 156. Horizontal sulfur condenser 100 may further include a Claus process gas inlet 107 proximate a first end 114 of the plurality of condenser tubes 102 opposite an end 138 of horizontal sulfur condenser 100 where sulfur reservoir 120 is located. The plurality of condenser tubes 102 may be positioned above sulfur reservoir 120, yet not necessarily directly over or directly on top of sulfur reservoir 120. Liquid sulfur outlet 122 may be positioned at liquid sulfur surface 118 of sulfur reservoir 120. Baffle 136 creates multiple chambers (e.g. two chambers) above sulfur reservoir 120. A first chamber 140 may be defined by the exterior casing, baffle 136 and be next to ends 116 of condenser tubes 102, and a second chamber 142 may be defined by exterior casing and baffle 136 and contain degassed liquid sulfur. A longitudinal central axis of horizontal sulfur condenser 100 is situated horizontally.

Figure 9:
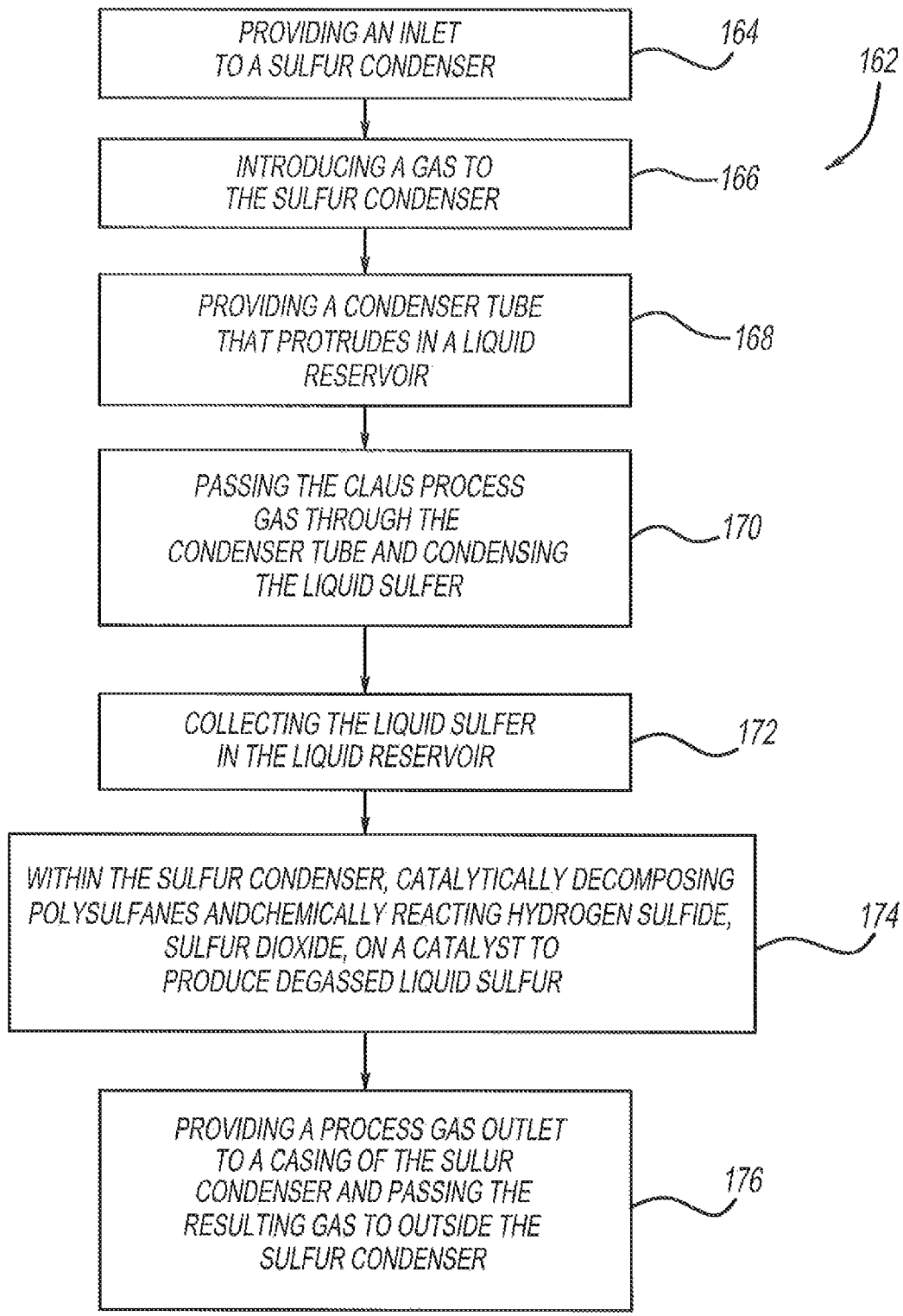
FIG. 9 is a flowchart depicting steps in a process of operating a Claus sulfur condenser in accordance with the present teachings.

Thus, as depicted in flowchart 162 of FIG. 9, a process of producing degassed liquid sulfur, such as in a vertical sulfur condenser 50 (FIG. 4), may involve step 164 which is providing a Claus process gas inlet 55 to a casing of a sulfur condenser 50. Step 166 may also be involved which is introducing a Claus process gas 54 into sulfur condenser 50. Step 168 may be involved which is providing a condenser tube 52 that protrudes into a liquid reservoir 70. The liquid reservoir 70 may be a mixture of liquid sulfur and a catalyst. Next, a step 170 may involve passing the Claus process gas inside and through condenser tube 52, including the portion of the condenser tube that protrudes into a liquid reservoir 70. In another step, condensing elemental sulfur from Claus process gas 54 in condenser tube 52 may be accomplished so that in step 172, collecting the condensed sulfur in the liquid reservoir 70 permits gathering of all the condensed sulfur. The process may further include providing a condenser tube 52 that protrudes into a liquid reservoir 70 that is a mixture of liquid sulfur and a catalyst and may further include providing part of the condenser tube 52 directly into the liquid reservoir 70. The process may further involve providing a Claus process gas outlet 92 to a casing of the sulfur condenser 50 between liquid reservoir 70 and tube sheet 57 that separates boiling water and degassed liquid sulfur, and passing the Claus process gas from inside the sulfur condenser to outside the sulfur condenser through the Claus process gas outlet 92. The process may further involve providing a Claus process gas outlet 92 to a casing of the sulfur condenser above liquid sulfur surface 68 and passing the Claus process gas from inside the sulfur condenser to outside the sulfur condenser through the Claus process gas outlet 92. Still yet, the process may include what is recited in step 174, which is, within the sulfur condenser, causing catalytic decomposition of the polysulfanes to $H_2S$ and sulfur and a chemical reaction in the liquid reservoir between the hydrogen sulfide, the sulfur dioxide, and the catalyst to produce degassed liquid sulfur, and passing the Claus process gas from inside the sulfur condenser to outside the sulfur condenser through the Claus process gas outlet 92. A degassed liquid sulfur outlet 72 may be provided to a casing of the sulfur condenser 50 in liquid reservoir 70 to pass degassed liquid sulfur 94 from inside sulfur condenser 50 to outside sulfur condenser 50 through outlet 92.

Thus, as depicted in flowchart 180 of FIG. 10, a process of producing degassed liquid sulfur, such as in horizontal sulfur condenser 100 (FIG. 7), may involve step 182, which is providing Claus process gas inlet 107 proximate first end 112 of a casing of sulfur condenser 100. The process may also include providing Claus process gas outlet 132 in second end 138 of the casing of sulfur condenser 100, and in step 184 providing a condenser tube 102 with internal passage 104 within sulfur condenser 100 between first end 112 and second end 138 of sulfur condenser 100. The process may also include, at step 186, providing or creating a liquid reservoir 120 proximate second end 138 of the casing after, at step 188, introducing Claus process gas 106 into sulfur condenser 100 through Claus process gas inlet 107. At step 190, passing the Claus process gas through a condenser tube 102 from the first end of the casing toward the second end and condensing elemental sulfur from Claus process gas 106 on an inside of condenser tube 102 to produce liquid sulfur and cooled Claus process gas. Forming a wall of liquid reservoir 120 may be accomplished with second end 138 of the casing. The process of flowchart 180 may continue with step 192 by providing baffle 136 that protrudes from the casing above liquid reservoir 120 and into liquid reservoir 120, but not entirely to the casing wall within the liquid to permit liquid to flow under or around baffle 136. At step 194, the process may further include collecting the condensed Claus process gas in liquid reservoir 120 on a first chamber or side 140 of baffle 136, and at step 196 within sulfur condenser 100, causing catalytic decomposition of the polysulfanes to $H_2S$ and sulfur and a chemical reaction in liquid reservoir 120 between hydrogen sulfide, sulfur dioxide, and a catalyst to produce a degassed liquid sulfur. At step 198, the process may further include, on a second side of baffle 136, passing the Claus process gas from inside sulfur condenser 100 to outside sulfur condenser 100 through the Claus process gas outlet 132. The process may further involve creating a first chamber and a second chamber with baffle 136 that are downstream of and end 116 of condenser tube 102.

The process may further involve providing a condenser tube (such as the lowest positioned condenser tube in FIG. 7) a first distance 156 from casing wall 154 of sulfur condenser 100, and at a second distance from the same casing wall 154 of sulfur condenser 100 providing surface 118 of liquid reservoir 120. The first distance is greater than the second distance. Providing baffle 136 perpendicular to the sulfur condenser wall above liquid sulfur 120 to facilitate direction of the Claus process gas from first chamber 140 to second chamber 142.

The process may further involve providing a Claus process gas outlet 132 in a casing of the sulfur condenser 100 above second chamber 142 and liquid reservoir 120, and passing the Claus process gas from inside the sulfur condenser to outside the sulfur condenser through the Claus process gas outlet 132. The process may further involve providing liquid sulfur outlet 122 in second chamber 142 at second distance 158 from casing wall 154.

Regardless of whether a vertical or horizontal sulfur condenser as described above is employed, Claus process gas entering the condensing section (e.g. condenser tubes) of the sulfur condenser will have $H_2S$ dissolved in the elemental sulfur condenser tubes from $H_2S$ (gas) passing over and against the liquid sulfur on an interior surface of the condenser tubes. Moreover, when $H_2S$ (gas) contacts $.S_x.$ (i.e. open chain di-radical sulfur in the liquid sulfur where generally $2<=x<=8$), what results is a polysulfane, $H_2S_x$ (dissolved, with $2<X<9$ being typical). When this mixes with sulfur held up in the liquid sulfur reservoir at the bottom of a sulfur condenser (e.g. in a vertical sulfur condenser 24) there are reactions to decompose the polysulfanes and consume $H_2S$ using a catalyst, which have been previously presented above. Cooled process gas from which the liquid elemental sulfur was removed in the condensing section (e.g. condenser tubes) of the exchanger also passes through the liquid sulfur reservoir held up at the bottom of vertical sulfur condenser, and at end of horizontal sulfur condenser. The gas will provide the agitation necessary (e.g. by forming bubbles as it passes through the liquid sulfur/catalyst) to aid in disengaging any $H_2S$ simply dissolved in the sulfur as well as $H_2S$ released from the breakdown of the sulfanes in solution by the action of the catalyst. Gas disengages from the liquid in the reservoir and travels upward to a vapor discharge nozzle (e.g. Claus process gas outlet) and exits the sulfur condenser. The removal of $H_2S$ shifts the equilibrium of the Claus reaction (see previously presented Equation 1) to the right allowing additional reduction of the $H_2S$ content of the liquid sulfur.

Regardless of which of the embodiments or processes employed, the catalyst employed can take several forms including pills, pellets, tri-lobes, or any of a variety of particle shapes. The catalysts can be made of high surface alumina oxide (gamma alumina) as used for Claus catalyst, more dense alumina support material coated with high surface area alumina or iron oxides enabling the particles to be contacted by incoming condensed sulfur and process gases throughout the liquid sulfur without floating on the surface, or ceramic foam monoliths coated with high surface area alumina or iron oxides fixed into the structure of the condenser in a zone that allows contact between the sulfur held up at the bottom of the condenser, sulfur condensed in the exchanger, and process gas from the exchanger. Regarding the embodiment depicted in FIG. 4, the depth of sulfur from end wall 64 maintained above tube ends 66 of condenser tubes 52 should be minimized to keep pressure drop to a minimum due to the pressure drip restrictions imposed by the normal operation of the Claus process.

Thus, the above teachings present multiple advantages. One advantage is that sulfur is degassed inside the Claus sulfur condenser rather than after the sulfur is removed from the condenser. Another advantage is the catalyst materials used cannot be readily dispersed in the liquid sulfur obviating the need for catalyst settling and recycling, or catalyst filtering and recycling. Another advantage occurs when only a small amount of pressure drop occurs through the contacting zone, which may slightly decrease unit capacity, to obtain an in-situ degassing benefit. Still yet, an advantage occurs as depicted in the data, when the contact zone and catalyst solve the problem of dissolved $H_2S$ and $H_2S_x$ in Claus sulfur by catalytic decomposition and agitation leading to an odor-free and safe process that greatly reduces emanation of dissolved $H_2S$ from product sulfur.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A process of producing degassed liquid sulfur within a sulfur condenser, comprising:
    introducing a Claus process gas through a gas inlet of an external casing of the sulfur condenser;
    providing a plurality of condenser tubes within the external casing wherein each condenser tube has an inlet end and an exit end for the Claus process gas to enter into each tube, pass through and exit from;
    arranging the exit ends of the plurality of condenser tubes to be submerged within a liquid reservoir resulting in submerged exit ends of the plurality of condenser tubes;
    passing the Claus process gas into the inlet ends of the plurality of condenser tubes;
    cooling the Claus process gas within the plurality of condenser tubes to produce condensed liquid sulfur within the plurality of condenser tubes;
    collecting the condensed liquid sulfur in the liquid reservoir upon exiting at an exit end of the plurality of condenser tubes; and
    contacting the liquid sulfur in the liquid reservoir with a catalyst to decompose polysulfanes to hydrogen sulfide and sulfur.

2. The process of claim 1, wherein cooling the Claus process gas within the plurality of condenser tubes to produce condensed liquid sulfur the plurality of condenser tubes further comprises:
    converting hydrogen sulfide by the Claus reaction $2H_2S + SO_2 \Leftrightarrow 3/xS_x + 2H_2O$; and
    decomposing polysulfanes to hydrogen sulfide and sulfur, wherein elemental sulfur is freed from hydrogen sulfide.

3. The process of claim 1, further comprising:
    providing the gas inlet at a first end of the sulfur condenser; and
    providing the liquid reservoir at a second end of the sulfur condenser.

4. The process of claim 3, further comprising:
    providing a first tube sheet between the plurality of condenser tubes and the external casing of the sulfur condenser at the inlet end of the plurality of condenser tubes thereby creating a liquid sealed end;
    providing a second tube sheet between the plurality of condenser tubes and the external casing of the sulfur condenser at an intermediate location of the plurality of condenser tubes thereby creating a liquid sealed end; and
    surrounding an exterior of the plurality of condenser tubes with boiling water between the first tube sheet and the second tube sheet.

5. The process of claim 1, further comprising:
    forcing uncondensed Claus process gas passing through the plurality of condenser tubes, and the condensed elemental sulfur, from the submerged exit ends of the plurality of condenser tubes and into the liquid reservoir.

6. The process of claim 5, further comprising:
    generating Claus process gas bubbles within the liquid reservoir;
    forcing the Claus process gas bubbles from an inside of the plurality of condenser tubes to an exterior of the plurality of condenser tubes; and
    producing degassed liquid sulfur within the liquid reservoir.

7. The process of claim 6, further comprising:
    providing a Claus process gas outlet through the external casing of the sulfur condenser between the liquid reservoir and the a second tube sheet; and
    passing the Claus process gas from inside the sulfur condenser to outside the sulfur condenser through the Claus process gas outlet.

8. The process of claim 7, further comprising:
    providing a degassed liquid sulfur outlet through the casing of the sulfur condenser; and
    passing the degassed liquid sulfur from inside the sulfur condenser to outside the sulfur condenser through the degassed liquid sulfur outlet.

9. The process of claim 8, wherein the liquid reservoir is a mixture of the condensed Claus process gas, liquid sulfur and a catalyst.

10. The process of claim 9, wherein the condensed Claus process gas contains elemental sulfur.

11. The process of claim 1, wherein the condenser tubes are vertically oriented.

12. A process of producing degassed liquid sulfur within a sulfur condenser, comprising:
    introducing a Claus process gas into the sulfur condenser through a Claus process gas inlet of a casing of the sulfur condenser;
    passing the Claus process gas into an entrance end of a condenser tube, through the condenser tube, and from a submerged exit end of the condenser tube residing in a liquid reservoir that is a mixture of a liquid sulfur and a catalyst;
    condensing elemental sulfur on an interior surface of the condenser tube as the Claus process gas is passing through the condenser tube to produce liquid sulfur on an interior surface of the condenser tube;
    passing the liquid sulfur directly into the liquid reservoir within the sulfur condenser; and
    contacting the liquid sulfur in the liquid reservoir with the catalyst to decompose polysulfanes to hydrogen sulfide and sulfur.

13. The process of claim 12, further comprising:
    generating a plurality of Claus process gas bubbles within the liquid reservoir containing a catalyst; and
    passing the plurality of Claus process gas bubbles from the liquid reservoir and into a gaseous chamber above the liquid sulfur reservoir.

14. The process of claim 13, further comprising:
    providing a Claus process gas outlet to a casing of the sulfur condenser above the liquid sulfur reservoir; and
    passing the Claus process gas from the chamber above the liquid sulfur reservoir to outside the sulfur condenser through the Claus process gas outlet.

15. The process of claim 14, further comprising:
    passing the liquid sulfur from inside the sulfur condenser to outside the sulfur condenser through a liquid sulfur outlet.

16. The process of claim 12, further comprising:
    within the sulfur condenser, causing a chemical reaction in the liquid reservoir between hydrogen sulfide, sulfur dioxide, and a catalyst to produce degassed liquid sulfur; and
    passing the Claus process gas from inside the sulfur condenser to outside the sulfur condenser through the Claus process gas outlet.

17. The process of claim 12, wherein condensing elemental sulfur on an interior surface of the condenser tube as the Claus process gas is passing through the condenser tube to produce liquid sulfur on an interior surface of the condenser tube further comprises:
    converting hydrogen sulfide by the Claus reaction $2H_2S + SO_2 \Leftrightarrow 3/xS_x + 2H_2O$; and
    decomposing polysulfanes to hydrogen sulfide and sulfur, wherein elemental sulfur is freed from hydrogen sulfide.

* * * * *